United States Patent
Einsla et al.

(10) Patent No.: US 9,453,148 B2
(45) Date of Patent: Sep. 27, 2016

(54) HEAT ACTIVATED PRESSURE SENSITIVE ADHESIVE

(71) Applicants: Rohm and Haas Company, Philadelphia, PA (US); Dow Global Technologies LLC, Midland, MI (US)

(72) Inventors: Melinda L. Einsla, Royersford, PA (US); William B. Griffith, Jr., North Wales, PA (US); Daniel W. Himmelberger, Green Lane, PA (US); Melissa Lane, Lawrenceville, NJ (US); David L. Malotky, Midland, MI (US)

(73) Assignees: Dow Global Technologies LLC, Midland, MI (US); Rohm and Haas Company, Philadelphia, PA (US)

(*) Notice: Subject to any disclaimer, the term of this patent is extended or adjusted under 35 U.S.C. 154(b) by 0 days.

(21) Appl. No.: 14/649,744

(22) PCT Filed: Dec. 2, 2013

(86) PCT No.: PCT/US2013/072570
§ 371 (c)(1),
(2) Date: Jun. 4, 2015

(87) PCT Pub. No.: WO2014/093043
PCT Pub. Date: Jun. 19, 2014

(65) Prior Publication Data
US 2015/0368521 A1 Dec. 24, 2015

Related U.S. Application Data

(60) Provisional application No. 61/735,618, filed on Dec. 11, 2012.

(51) Int. Cl.
C09J 153/02 (2006.01)
C09J 7/02 (2006.01)
C09J 109/06 (2006.01)

(52) U.S. Cl.
CPC ............. *C09J 109/06* (2013.01); *C09J 7/0203* (2013.01); *C09J 153/02* (2013.01)

(58) Field of Classification Search
CPC ................................ C09J 153/02; C09J 7/02
See application file for complete search history.

(56) References Cited

U.S. PATENT DOCUMENTS

| | | | |
|---|---|---|---|
| 4,367,732 A * | 1/1983 | Poulsen | A61L 24/0094 602/56 |
| 6,828,017 B2 | 12/2004 | Kugo et al. | |
| 7,056,552 B2 | 6/2006 | Kugo et al. | |
| 7,947,776 B2 | 5/2011 | Moncla et al. | |
| 8,921,467 B2 | 12/2014 | Sommer et al. | |
| 2007/0100306 A1 | 5/2007 | DiZio et al. | |
| 2011/0178234 A1 | 7/2011 | Wang et al. | |
| 2011/0293834 A1 | 12/2011 | Allen et al. | |

FOREIGN PATENT DOCUMENTS

| JP | H06179856 A | 6/1994 |
|---|---|---|
| JP | 2008038057 A | 2/2008 |

* cited by examiner

*Primary Examiner* — Robert Harlan
(74) *Attorney, Agent, or Firm* — Kenneth Crimaldi

(57) ABSTRACT

A composition having three components. The first component is from 20 to 80 wt % of a styrene-diene block copolymer having from 10-30 wt % polymerized units of styrene, wherein the block copolymer is present as a dispersion of copolymer in water, and the dispersion contains less than 5 wt % organic solvent based on total dispersion weight. The second component is from 0.5 to 20 wt % of a plasticizer. The third component is from 20 to 80 wt % of a tackifier.

10 Claims, No Drawings

HEAT ACTIVATED PRESSURE SENSITIVE ADHESIVE

This invention relates to a heat-activated pressure-sensitive adhesive useful in producing labels having no liner.

Thermally activated pressure-sensitive adhesives containing adhesive polymer, plasticizer and tackifier have been described. For example, U.S. Pub. No. 2011/0293834 discloses an adhesive containing an acrylic polymer and dicyclohexyl phthalate as the plasticizer. However, the prior art does not disclose a heat-activated pressure-sensitive adhesive having both good adhesive properties and good blocking properties.

The problem addressed by the present invention is to provide a heat-activated pressure-sensitive adhesive having both good adhesive properties and good blocking properties.

STATEMENT OF INVENTION

The present invention provides a composition comprising: (a) from 20 to 80 dry wt % of a styrene-diene block copolymer having from 10-30 wt % polymerized units of styrene, wherein the block copolymer is present as a dispersion in water, and the dispersion contains less than 5 wt % organic solvent based on total dispersion weight; (b) from 0.5 to 20 dry wt % of a plasticizer; and (c) from 20 to 80 dry wt % of a tackifier.

The present invention further provides a method for preparing a heat-activated pressure sensitive adhesive; said method comprising combining: (a) from 20 to 80 dry wt % of a styrene-diene block copolymer having from 10-30 wt % polymerized units of styrene, wherein the block copolymer is present as a dispersion in water, and the dispersion contains less than 5 wt % organic solvent based on total dispersion weight; (b) from 0.5 to 20 dry wt % of a plasticizer; and (c) from 20 to 80 dry wt % of a tackifier; to produce an adhesive composition; and coating the adhesive composition on paper or plastic film, said paper or plastic film having a thickness from 12 to 130 microns.

DETAILED DESCRIPTION

Percentages are weight percentages (wt %) and temperatures are in ° C., unless specified otherwise. References to room temperature or ambient temperature indicate a temperature from 20-25° C. Weight percentages of monomer residues are based on the total weight of monomer residues in the polymer. Weight percentages of copolymer, plasticizer, tackifier and any other components in the composition are specified if on a dry (dry wt %) or wet (wet wt %) basis. All polymer Tg and Tm values are determined by differential scanning calorimetry (DSC) according to ASTM D3418.

Styrene-diene block copolymers are any block copolymers of styrene and an aliphatic diene. Preferably, the diene is a $C_2$-$C_8$ diene, preferably $C_2$-$C_6$ diene. Preferred styrene-diene block copolymers are styrene-isoprene-styrene (SIS), styrene-ethylene-butadiene-styrene (SEBS), styrene-butadiene-styrene (SBS), styrene-ethylene-propylene-styrene (SEPS), olefin block copolymers (OBC); preferably SIS. Preferably, styrene-diene block copolymers comprise 12-25 wt % polymerized units of styrene, preferably 15-20 wt %. Preferably, the styrene-diene block copolymers have a melt index (MI, measured per ISO 1133) from 1-100 g/10 min, preferably from 5-70, preferably from 10-50. Preferably, styrene-diene block copolymers have 10-70 wt % diblock content and 30-90 wt % triblock content, preferably 15-60 wt % diblock content and 40-85 wt % triblock content. Optionally blends of different styrene-diene block copolymers can be used.

Preferably the aqueous dispersion of a styrene-diene block copolymer contains a dispersant. In one preferred embodiment, the dispersant is a $C_{18}$-$C_{32}$ aliphatic carboxylic acid, preferably a $C_{18}$-$C_{28}$ aliphatic carboxylic acid, preferably a $C_{20}$-$C_{26}$ aliphatic carboxylic acid. In one preferred embodiment of the invention, the dispersant is an olefin-acrylic acid copolymer, preferably one having from 10 wt % to 30 wt % acrylic acid, preferably from 15 wt % to 25 wt %. In a preferred embodiment of the invention, other materials such as partially hydrolyzed polyvinyl alcohol, styrene maleic anhydride copolymers, maleic anhydride modified polyethylene, polypropylene, or polyolefin copolymers, maleic anhydride modified styrene-diene block copolymers, or their mixtures may also be used as dispersants. Optionally the conventional cationic, ionic, or non-ionic surfactants can be used in combination with above polymeric dispersing agents. Preferably, the aqueous dispersion comprises from 25 dry wt % to 50 dry wt % of styrene-diene block copolymer, preferably from 25 dry wt % to 45 dry wt %, preferably from 30 dry wt % to 45 dry wt %. When the dispersant is a $C_{18}$-$C_{32}$ aliphatic carboxylic acid, preferably it is present in an amount from 2 dry wt % to 10 dry wt % based on the weight of the styrene-diene block copolymer, preferably from 2 dry wt % to 8 dry wt %, preferably from 3 dry wt % to 7 dry wt %. When the dispersant is an olefin-acrylic acid copolymer, preferably it is present in an amount from 15 dry wt % to 35 dry wt % based on the weight of the styrene-diene block copolymer, preferably from 20 dry wt % to 30 dry wt %, preferably from 22 dry wt % to 28 dry wt %. Preferably, the aqueous dispersion contains less than 5 wt % organic solvent based on total dispersion weight, preferably less than 4 wt %, preferably less than 3 wt %, preferably less than 2 wt %, preferably less than 1 wt %, preferably less than 0.5 wt %. Preferably, the composition has less than 4 wt % organic solvent based on total composition weight, preferably less than 3 wt %, preferably less than 2 wt %, preferably less than 1 wt %, preferably less than 0.5 wt %, preferably less than 0.3 wt %. Preferably, solvents which may be present within the stated limits in the aqueous dispersion (from preparation of the styrene-diene block copolymer) or in the composition are hydrocarbyl solvents, preferably aromatic solvents, preferably toluene.

Preferably, the composition comprises at least 25 dry wt % of the styrene-diene block copolymer, preferably at least 30 dry wt %, preferably at least 35 dry wt %, preferably at least 40 dry wt %; preferably no more than 75 dry wt %, preferably no more than 70 dry wt %, preferably no more than 65 dry wt %, preferably no more than 60 dry wt %, preferably no more than 55 dry wt %.

Preferably, the composition comprises at least 22 dry wt % of the tackifier, preferably at least 24 dry wt %, preferably at least 26 dry wt %, preferably at least 28 dry wt %; preferably no more than 75 dry wt %, preferably no more than 70 dry wt %, preferably no more than 60 dry wt %, preferably no more than 50 dry wt %, preferably no more than 45 dry wt %.

Preferably, the tackifier comprises a rosin ester resin, a non-hydrogenated aliphatic $C_5$ resin, a hydrogenated aliphatic $C_5$ resin, an aromatic modified $C_5$ resin, a terpene resin, a hydrogenated $C_9$ resin, or combinations thereof, where "$C_5$" and "$C_9$" refer to the number of carbon atoms in the starting materials used. Preferably, the tackifier has a softening point from 65 to 180° C., preferably from 90 to 140° C. Preferably, the tackifier has density from 0.92 g/cc to 1.06 g/cc and has a melt viscosity less than 1000 pascal second (Pa·s) at 175° C. Preferably, the tackifier is present in the form of an aqueous dispersion.

Preferably, the composition comprises at least 1 dry wt % plasticizer, preferably at least 3 dry wt %, preferably at least 5 dry wt %, preferably at least 6 dry wt %, preferably at least 7 dry wt %, preferably at least 8 dry wt %, preferably at least 9 dry wt %; preferably no more than 18 dry wt %, preferably no more than 15 dry wt %, preferably no more than 12 dry wt %, preferably no more than 11 dry wt %.

Preferably, the plasticizer has a melting point from 50-150° C. Preferably, the melting point of the plasticizer is at least 55° C., preferably at least 60° C., preferably at least 62° C., preferably at least 64° C., preferably at least 66° C.; preferably, the melting point is no greater than 130° C., preferably no greater than 120° C., preferably no greater than 110° C., preferably no greater than 100° C., preferably no greater than 90° C., preferably no greater than 80° C. In one preferred embodiment of the invention, the plasticizer is an amorphous material having a softening point from 50-150° C. Preferably, the softening point of the plasticizer is at least 55° C., preferably at least 60° C., preferably at least 62° C., preferably at least 64° C., preferably at least 66° C.; preferably, the softening point is no greater than 130° C., preferably no greater than 120° C., preferably no greater than 110° C., preferably no greater than 100° C., preferably no greater than 90° C., preferably no greater than 80° C.

Preferably, the $\Delta\delta$ based on Hoy solubility parameter for the plasticizer and the styrene domains of the SIS copolymer (i.e., polystyrene) is at least 1.5 $(MJ/m^3)^{1/2}$, preferably at least 2 $(MJ/m^3)^{1/2}$, preferably at least 2.5 $(MJ/m^3)^{1/2}$, preferably at least 3 $(MJ/m^3)^{1/2}$, preferably at least 3.25 $(MJ/m^3)^{1/2}$; preferably the $\Delta\delta$ parameter is no greater than 30 $(MJ/m^3)^{1/2}$, preferably no greater than 25 $(MJ/m^3)^{1/2}$, preferably no greater than 20 $(MJ/m^3)^{1/2}$, preferably no greater than 18 $(MJ/m^3)^{1/2}$.

Hoy solubility parameters are used to estimate the miscibility of each potential plasticizer in the polystyrene domains of the polymer. A complete description of the formulas employed by Hoy as well as well as functional group contributions to the molar functions can be found in *Properties of Polymers—Their Correlation with Chemical Structure; Their Numerical Estimation and Prediction from Additive Group Contributions* by D. W. van Krevelen. To estimate the miscibility of various potential plasticizers with the polystyrene domains of the polymer, the total solubility parameter ($\delta_t$) as well as its components ($\delta_d$, $\delta_p$, $\delta_h$, $\delta_v$) are employed. For each potential plasticizer, the solubility parameter components are calculated and compared to those of polystyrene using the formula:

$$\Delta\delta = [(\Delta\delta_h)^2 + (\Delta\delta_v)^2]^{1/2}$$

where $\Delta\delta_h$ is the difference in $\delta_h$ between polystyrene and the test material, and $\Delta\delta_v$ is the difference in $\delta_v$ between polystyrene and the test material. $\delta_v$ is a component that combines both the polar and dispersive components of the solubility parameter. $\Delta\delta$ therefore is a numerical representation of the distance between two points (two materials) on a two-dimensional plot of $\delta_h$ vs. $\delta_v$. The closer the two points are, or the smaller the value of $\Delta\delta$, the more miscible the materials are predicted to be.

Preferably, the plasticizer is Benzyl-2-napthylether, glyceryl tribenzoate, p-tolylphenyl acetate, benzaphthalide, retinyl acetate, tetraethylthiuram disulfide, isoeugenyl acetate, vanillin acetate, ethyl vanillin, glucose pentaacetate, 1,4-cyclohexanedimethanol dibenzoate, sucrose benzoate, propyl-4-hydroxybenzoate, 3,5-di-tert-butyl-4-Hydroxybenzyl Alcohol, methyl-4-hydroxybenzoate, butyl-4-hydroxybenzoate, benzoic acid, phenylacetic acid, phenoxyacetic acid, stearic acid, polyethylene imine, vitamin A acetate, sucralose, behenic acid, lauramide, stearamide, erucamide, bis (2,2,6,6-tetramethyl-4-piperidyl) sebacate, docosanol, dimethyl terephthalate, sucrose octaacetate, methyl cylopentenolone, candelilla wax, dehydroacetic acid, ascorbyl palmitate, agar agar, vanillin, 4-(4-Hydroxyphenyl)-2-butanone, 1,2-diphenoxyethane, ethylene glycol-m-toylether, ethylene bis-stearamide, dibenzyl oxalate, di-(p-chlorobenzyl)oxalate, di-(p-methylbenzyl)oxalate, diphenyl sulfonate, p-benzyl diphenyl, 2,6-diisopropyl naphthalene, 2,6-diisopropyl naphthalene, benzyl p-hydroxybenzoate, benzyl ether, diphenyl ether of 1,2-bis(hydroxymethyl benzene), diphenyl ether of 1,2-bis(hydroxymethyl benzene), 4,4'-diisopropylbiphenyl, m-terphenyl, anthranilic acid, benzamide, salicylamide, 3-(dimethylamino)benzoic acid, 4-(oxtyloxy)benzoic acid, 3-(chloromethyl)benzoic acid, 2-(chloromethyl)benzoic acid, 3-(methylamino)benzoic acid, 3-(1-cyanoethyl)benzoic acid, 4-(t-butoxymethyl)benzoic acid, 4-(butylamino)benzoic acid, phenyl benzoate, cholesteryl benzoate, 4-methylphenyl benzoate, 4-chlorophenyl benzoate, 4-chlorobenzyl benzoate, methyl-4-(cyanomethyl)benzoate, methyl 3-(4-hydroxyphenyl)benzoate, methyl 4-(bromomethyl)benzoate, ethyl 4-(dimethylamino) benzoate, methyl 4-(4-formylphenyl)benzoate, methyl 4-(3-formylphenyl)benzoate, ethyl 4-(butylamino)benzoate, methyl 3-methoxy-2-(2-methoxy-2-oxoethoxy)benzoate, diphenyl phthalate, monomethyl phthalate, monobutyl phthalate, monobenzyl phthalate; preferably Benzyl-2-Naphthyl Ether (BON), Glyceryl Tribenzoate (GTB), p-Tolylphenyl Acetate (p-TPA), Benzalphthalide, Retinyl Acetate, Tetraethylthiuram Disulfide (TETS), Isoeugenyl Acetate, Vanillin Acetate, Ethyl Vanillin, Glucose Pentaacetate, 1,4-Cyclohexane Dimethanol Dibenzoate (DCHP), Sucrose Benzoate (SB), Propyl-4-Hydroxy Benzoate, 3,5-di-tert-4-Hydroxybenzyl Alcohol, Methyl-4-Hydroxy Benzoate, Butyl-4-Hydroxy Benzoate, Benzoic Acid, Trimethylolpropane, Di(trimethylolpropane), Phenylacetic Acid or Phenoxyacetic Acid; preferably sucrose benzoate or glyceryl tribenzoate.

Preferably, the plasticizer has a heat of fusion from 1 to 200 J/g, preferably from 5 to 150 J/g, preferably from 5 to 90 J/g. Preferably, the plasticizer reduces the Tg of the styrene domains in the styrene-diene copolymer by 15 to 100° C., preferably 20 to 80° C., as determined by DSC.

Preferably, the copolymer, tackifier and plasticizer are mixed together at room temperature in a batch process using a blade impeller with designs that are well know to those skilled in the art. Mixing rpm's are generally optimized around rates that maintain good agitation throughout the mixture without entraining air. The adhesive composition can be applied to a web by a number of techniques such as wire wound rod, comma coater, gravure, roll coater, slide, slot die, knife over roll, or curtain coater. It is anticipated that the adhesive composition may need to be tuned by the addition of additives such as thickeners, surfactants, and defoamers for the targeted coating method.

The adhesive composition is coated on a substrate comprising paper (e.g., semi-gloss paper or thermal paper) or plastic film (e.g., polypropylene or polyester). Preferably, the substrate has a thickness from 20 to 100 microns, preferably from 25 to 80 microns, preferably from 30 to 70 microns. The coating thickness of the adhesive composition preferably is from 5 to 80 microns, preferably from 7 to 70 microns, preferably from 9 to 65 microns. The coated substrate is dried to remove water, preferably in an oven at a temperature below 150° C., preferably below 140° C., preferably below 130° C., preferably below 120° C., preferably below 110° C. The coated dried substrate is formed into a roll without placing a liner over the adhesive. The dried adhesive layer does not adhere to the substrate with which comes in contact when the coated dried substrate is formed into a roll. Preferably, the side of the substrate opposite the coated side receives printing with a suitable ink to form a label. The label may be placed on a substrate and heated to activate the adhesive and attach the label.

EXAMPLES

Preparation of SIS Aqueous Dispersion

Dispersions were prepared on a 25 mm diameter twin screw extruder according to the process described in U.S. Pat. No. 7,947,776 (see especially Example 6). The stabilizer was delivered by a volumetric feeder, the KRATON SIS base polymer was delivered by a loss-in-weight feeder. The stabilizer was PRIMACOR 5980 (80/20, ethylene/acrylic acid polymer; melt index 300 g/10 min (ASTM D1238, 190 C/2.16 kg); available from Dow Chemical) or UNICID 350 ($C_{23}$-$C_{26}$ saturated aliphatic carboxylic acids, available from Baker Hughes). The SIS polymers were KRATON D1113 (triblock copolymer, 16% polymerized styrene units, 56% diblock) and KRATON D1161 (linear block copolymer, 15% polymerized styrene units, 19% diblock). In the extruder the base polymer and stabilizer were melted, mixed and forwarded. The extruder temperature profile was set to 190° C. across the barrel for dispersion D, 120 C across the barrel for dispersion A and B. For dispersion D, 30% wt. potassium hydroxide (CAS No. 71769-53-4) was used as the neutralizing agent. For dispersions A and B, DMEA, 2-dimethyl amino ethanol (100%) (CAS No. 108-01-0) was used as the neutralizing agent. The extruder speed was approximately 450 rpm. Neutralizing agent and initial water were mixed together and fed to the extruder at the initial water introduction point. The dilution water was fed via a second pump, and it was introduced into the dilution zone of the extruder. The initial water and dilution water streams were optionally pre-heated to the extruder temperature. At the extruder outlet, a back-pressure regulator was used to adjust to a suitable pressure inside the extruder barrel to prevent steam formation at the operating temperature. The resulting dispersions were cooled and filtered through a 200 micron filter. Properties of the dispersions are shown in Table 1 and Table 2.

TABLE 1

| Aqueous Dispersion | Base Resin (g/min) | Stabilizing Agent (g/min) | Neutralizing Agent (ml/min) | Initial Water Rate (ml/min) | Dilution Water Rate (ml/min) | Average Particle Size Diameter (microns) |
|---|---|---|---|---|---|---|
| A | Kraton 1113 (60.5) | Primacor 5980 (15.1) | 6.1 | 7.0 | 80 | 2.4 |
| B | Kraton 1161 (60.5) | Primacor 5980 (15.1) | 6.1 | 10.0 | 100 | 5.9 |
| D | Kraton 1161 (41.2) | Unicid 350 (3.8) | 1.02 | 3.94 | 110 | 0.9 |

TABLE 2

| | Base Resin (W %) | Stabilizing Agent (W %) | Neutralizing Agent (W %) | Water (W %) | Total Solid (W %) | % Neut. | pH | Average Particle Size Diameter (microns) |
|---|---|---|---|---|---|---|---|---|
| A | Kraton 1113 (36.8%) | Primacor 5980 (9.2%) | 3.7% | 50.3% | 46.0% | 140% | 9.8 | 2.4 |
| B | Kraton 1161 (31.7%) | Primacor 5980 (7.9%) | 3.2% | 54.6% | 42.2% | 140% | 10.0 | 5.9 |
| D | Kraton 1161 (25.8%) | Unicid 350 (2.4%) | 0.6% | 71.4% | 28.4% | 90% | 10.8 | 0.9 |

In the examples the three component dispersions were weighed into a 6 dram vials in the desired ratio with a total wet weight of 20 grams. The vials were capped and shook by hand for 30 seconds to ensure the sample was well mixed. The samples were then allowed to rest for 2 hours before being applied to a substrate (either 2 mil untreated oriented polypropylene or direct thermal paper). A 1.6 mil wet coating of the sample mixture was applied to the substrate with a BYK applicator bar. The coated samples were then dried in a convection oven at 50° C. for 10 minutes leaving a 0.5-0.9 mil dry film.

The dry films were placed against silicone release paper for protection and then left in a controlled temperature (72° F.) and humidity (50% RH) room overnight to equilibrate. The films were then cut into 1" by 6" strips for adhesive (Peel) and blocking tests. The test strips were then activated by heat using a Werner Mathis AG oven set at 110° C. and 15 seconds with the strips adhesive side up resting on a mesh shelf where the square mesh was 0.5 cm. The strips were then immediately laminated to test substrates described below with a 2 kg hand roller. Peel Force was a measure of the force required to remove a film coated with an adhesive from a substrate. Peel force was measured after a 60 minute dwell time and 24 hour dwell time after the lamination step. Specifically 180° peel force was measured using Test method PSTC 101 Test method A from stainless steel (SS) panels and high density polyethylene (HDPE) panels once for each dwell time. Blocking tests used unactivated test strips and faced the adhesive towards a piece of polyester film or direct thermal paper (image layer towards adhesive) fixed to a stainless steel panel. This construction was placed in a 50° C. oven for 1 week with a 1 kg weight on top of the test strip with the resulting pressure of >=12 grams per cm². After one week the construction was placed in a controlled temperature (72° F.) and humidity (50% RH) room overnight to equilibrate. The test strip was then subjected to the above described 180° peel force test twice in most cases since each test only uses ~2.5 inches of the construction.

All formulations in the examples give wet weight fractions. Dry film solids can be calculated based on the given solids of each component in the formulation.

Formulation of Adhesive Compositions

| Oriented Polypropylene | | | |
|---|---|---|---|
| | SIS Dispersion | Dispersed Tackifier | Dispersed Plasticizer |
| 1 | 0.65 | 0.20 | 0.15 |
| 2 | 0.55 | 0.35 | 0.10 |
| 3 | 0.35 | 0.50 | 0.15 |
| 4 | 0.75 | 0.20 | 0.05 |
| 5 | 0.45 | 0.50 | 0.05 |
| 6 | 0.35 | 0.50 | 0.15 |
| 7 | 0.45 | 0.50 | 0.05 |
| 8 | 0.55 | 0.35 | 0.10 |

| Direct Thermal Paper | | | |
|---|---|---|---|
| | SIS Dispersion | Dispersed Tackifier | Dispersed Plasticizer |
| 1 | (0.35) A | 0.50 | 0.15 DCHP |
| 2 | (0.35) A | 0.50 | 0.15 GTB |
| 3 | (0.45) B | 0.50 | 0.05 DCHP |
| 4 | (0.45) B | 0.50 | 0.05 GTB |
| 5 | (0.45) D | 0.50 | 0.05 SB |
| 6 | (0.35) D | 0.50 | 0.15 GTB |

| | A (80/20) Kraton | B (80/20) Kraton | D (95/5) Kraton |
|---|---|---|---|
| SIS Dispersion | D1113 / Primacor 5980 w DMEA (46% solids) | D1161 / Primacor 5980 w DMEA (42% solids) | D1161/Unicid 350 w/KOH (28% solids) |

Failure Modes
C = Cohesive Failure
A = Adhesive Failure
AFB = Adhesive Failure from backing (facestock)
PT = Paper Tear
ILT = Image Layer Tear Plasticizer Acronyms
DCHP = Dicyclohexylphthalate (Aquaspersions - 55% solids)
GTB = Glyceryl Tribenzoate (Aquaspersions - 44% solids)
SB = Sucrose Benzoate (Aquaspersions - 44% solids)
BON = Benzyl 2-naphthyl ether (Nissho Kogyo - 40% solids)

Tackifier—Lawter Snowtack 100 G (56% solids)
Test Results for Adhesives Coated on Substrates

| SIS Dispersion (A), Tackifier (Snowtack 100 G), and Plasticizer (Dicyclohexylphthalate) | | | | | | | | | |
|---|---|---|---|---|---|---|---|---|---|
| | 180° Peel, Stainless Steel (N/inch) | | | | 180° Peel, HDPE (N/inch) | | | | 180° Peel (N), Weighted down with 1 kg, Blocking 50° C. for 1 week (+24 hr CTR) |
| | 1 | | 24 | | 1 | | 24 | | |
| | hour dwell | Failure Mode | hour dwell | Failure Mode | hour dwell | failure mode | hour dwell | Failure Mode | on PET peel 1/2 | Failure Mode |
| 1 | 1.0 | A | 0.7 | A | 0.8 | A | 0.9 | A | 2.2/2.6 | A |
| 2 | 6.1 | A | 5.1 | A | 5.9 | A | 3.3 | A | 4.5/3.0 | C |
| 3 | 18.5 | C | 13.1 | C | 15.0 | A | 21.2 | C | 4.7/3.3 | C |
| 4 | 0.7 | A | 0.9 | A | 0.6 | A | 0.6 | A | 0.8/0.9 | A |
| 5 | 11.9 | C | 6.2 | C | 14.7 | C | 10.5 | C | 2.5/1.8 | C |
| 6 | 18.3 | C | 15.7 | AFB | 13.8 | C | 21.9 | C | 4.0/3.8 | C |
| 7 | 12.0 | C | 11.9 | C | 18.2 | C | 9.9 | C | 3.6/2.1 | C |
| 8 | 6.8 | A | 7.6 | C | 5.6 | A | 10.0 | A | 6.1/5.9 | A |

| | SIS Dispersion (A), Tackifier (Snowtack 100 G), and Plasticizer (Sucrose Benzoate) | | | | | | | | |
|---|---|---|---|---|---|---|---|---|---|
| | 180° Peel, Stainless Steel (N/inch) | | 180° Peel, HDPE (N/inch) | | | | 180° Peel (N), Weighted down with 1 kg, Blocking 50° C. | |
| | 1 | | 24 | | 1 | | 24 | for 1 week (+24 hr CTR) | |
| | hour dwell | failure mode | hour dwell | failure mode | hour dwell | failure mode | hour dwell | Failure Mode | on PET peel 1/2 | Failure Mode |
| 1 | 0.5 | A | 0.2 | A | 0.2 | A | 0.2 | A | 0.6/0.7 | A |
| 2 | 1.3 | A | 2.3 | A | 1.6 | A | 3.5 | A | 3.0/0.9 | A |
| 3 | 0.5 | A | 0.1 | A | 0.1 | A | 0.1 | A | 1.1/0.8 | C |
| 4 | 0.7 | A | 1.1 | A | 0.6 | A | 1.6 | A | 0.8/0.8 | A |
| 5 | 1.0 | A | 3.6 | A | 3.3 | A | 2.3 | A | 4.5/1.9 | C |
| 6 | 0.1 | A | 0.1 | A | 0.2 | A | 0.1 | A | 1.4/1.0 | C |
| 7 | 1.3 | A | 5.7 | A | 2.9 | A | 2.5 | A | 5.4/1.6 | C |
| 8 | 0.6 | A | 3.8 | A | 1.5 | A | 1.8 | A | 2.4/1.3 | C |

| | SIS Dispersion (A), Tackifier (Snowtack 100 G), and Plasticizer (Glyceryl Tribenzoate) | | | | | | | | |
|---|---|---|---|---|---|---|---|---|---|
| | 180° Peel, Stainless Steel (N/inch) | | 180° Peel, HDPE (N/inch) | | | | 180° Peel (N), Weighted down with 1 kg, Blocking 50° C. | |
| | 1 | | 24 | | 1 | | 24 | for 1 week (+24 hr CTR) | |
| | hour dwell | Failure Mode | hour dwell | Failure Mode | hour dwell | Failure Mode | hour dwell | Failure Mode | on PET peel 1/2 | Failure Mode |
| 1 | 0.5 | A | 1.2 | A | 0.7 | A | 0.8 | A | 0.3/0.2 | A |
| 2 | 5.0 | A | 5.1 | A | 2.0 | A | 3.5 | A | 0.3/0.3 | A |
| 3 | 1.2 | AFB | 0.3 | A | 4.0 | C | 0.9 | AFB | 1.2/0.3 | AFB |
| 4 | 0.4 | A | 0.3 | A | 0.3 | A | 0.3 | A | 0.2/0.2 | A |
| 5 | 5.5 | C | 0.7 | C | 9.2 | C | 8.6 | C | 2.9/2.2 | C |
| 6 | 4.2 | C | 1.0 | AFB | 2.7 | C | 0.1 | AFB | 0.7/0.2 | AFB |
| 7 | 5.7 | C | 0.0 | A | 8.7 | C | 9.4 | C | 2.4/0.6 | C |
| 8 | 1.9 | A | 0.1 | A | 2.9 | A | 4.1 | A | 0.2/0.1 | A |

| | SIS Dispersion (A), Tackifier (Snowtack 100 G), and Plasticizer (Benzyl 2-naphthyl ether) | | | | | | | | |
|---|---|---|---|---|---|---|---|---|---|
| | 180° Peel, Stainless Steel (N/inch) | | 180° Peel, HDPE (N/inch) | | | | 180° Peel (N), Weighted down with 1 kg, Blocking 50° C. | |
| | 1 | | 24 | | 1 | | 24 | for 1 week (+24 hr CTR) | |
| | hour dwell | Failure Mode | hour dwell | Failure Mode | hour dwell | Failure Mode | hour dwell | Failure Mode | on PET peel 1/2 | Failure Mode |
| 1 | 1.9 | A | 2.0 | A | 1.2 | A | 2.9 | A | 1.3/1.2 | A |
| 2 | 10.0 | A | 1.9 | A | 8.1 | A | 8.8 | A | 3.6/3.7 | A |
| 3 | 19.8 | A | 6.6 | A | 15.9 | A | 11.0 | A | 2.6/1.9 | A |
| 4 | 0.5 | A | 1.0 | A | 0.2 | A | 0.4 | A | 3.3/1.9 | A |
| 5 | 10.3 | A | 0.3 | A | 15.2 | A | 10.8 | A | 4.7/3.3 | A |
| 6 | 21.2 | A | 15.4 | A | 12.2 | A | 6.2 | AFB | 2.2/2.0 | A |
| 7 | 9.5 | A | 8.7 | A | 15.7 | A | 9.5 | A | 4.3/2.3 | C |
| 8 | 8.7 | A | 5.3 | A | 7.8 | A | 7.4 | A | 3.6/2.9 | A |

| | SIS Dispersion (B), Tackifier (Snowtack 100 G), and Plasticizer (Dicyclohexylphthalate) | | | | | | | | | |
|---|---|---|---|---|---|---|---|---|---|---|
| | 180° Peel, Stainless Steel (N/inch) | | | | 180° Peel, HDPE (N/inch) | | | | 180° Peel (N), Weighted down with 1 kg, Blocking 50° C. for 1 week (+24 hr CTR) | |
| | 1 hour dwell | Failure Mode | 24 hour dwell | Failure Mode | 1 hour dwell | Failure Mode | 24 hour dwell | Failure Mode | on PET peel 1/2 | Failure Mode |
| 1 | 1.0 | A | 0.7 | A | 0.8 | A | 1.1 | A | 2.6/3.1 | A |
| 2 | 7.1 | A | 4.5 | A | 5.4 | A | 5.8 | A | 5.9/3.1 | A |
| 3 | 17.6 | C | 14.8 | C | 16.2 | C | 11.9 | A | 4.6/3.9 | C |
| 4 | 0.8 | A | 0.5 | A | 0.9 | A | 0.8 | A | 1.1/1.0 | A |
| 5 | 11.6 | AFB | 6.5 | AFB | 14.8 | C | 9.6 | AFB | 3.1/2.9 | C |
| 6 | 13.8 | C | 11.4 | AFB | 18.9 | C | 12.9 | A | 5.6/4.9 | C |
| 7 | 12.2 | AFB | 8.1 | AFB | 15.0 | AFB | 12.4 | AFB | 4.7/3.5 | C |
| 8 | 8.4 | A | 10.0 | A | 6.2 | A | 6.7 | A | 6.6/6.1 | C |

| | SIS Dispersion (B), Tackifier (Snowtack 100 G), and Plasticizer (Sucrose Benzoate) | | | | | | | | | |
|---|---|---|---|---|---|---|---|---|---|---|
| | 180° Peel, Stainless Steel (N/inch) | | | | 180° Peel, HDPE (N/inch) | | | | 180° Peel (N), Weighted down with 1 kg, Blocking 50° C. for 1 week (+24 hr CTR) | |
| | 1 hour dwell | Failure Mode | 24 hour dwell | Failure Mode | 1 hour dwell | Failure Mode | 24 hour dwell | Failure Mode | on PET peel 1/2 | Failure Mode |
| 1 | 0.1 | A | 1.0 | A | 0.2 | A | 0.3 | A | 2.0/0.8 | A |
| 2 | 0.4 | A | 5.8 | A | 2.6 | A | 3.9 | A | 2.9/2.9 | C |
| 3 | 0.2 | A | 0.4 | A | 0.1 | A | 0.5 | A | 2.5/0.9 | C |
| 4 | 1.0 | A | 0.4 | A | 0.7 | A | 0.7 | A | 1.5/0.8 | A |
| 5 | 2.4 | A | 6.1 | A | 4.0 | A | 4.3 | A | 6.6/3.8 | C |
| 6 | 0.1 | A | 0.1 | A | 0.2 | A | 0.3 | A | 1.7/0.9 | C |
| 7 | 5.8 | A | 10.1 | A | 3.1 | A | 4.8 | C | 5.6/3.8 | C |
| 8 | 2.2 | A | 4.4 | A | 1.0 | A | 2.1 | A | 4.6/9.5 | C |

| | SIS Dispersion (B), Tackifier (Snowtack 100 G), and Plasticizer (Glyceryl Tribenzoate) | | | | | | | | | |
|---|---|---|---|---|---|---|---|---|---|---|
| | 180° Peel, Stainless Steel (N/inch) | | | | 180° Peel, HDPE (N/inch) | | | | 180° Peel (N), Weighted down with 1 kg, Blocking 50° C. for 1 week (+24 hr CTR) | |
| | 1 hour dwell | Failure Mode | 24 hour dwell | Failure Mode | 1 hour dwell | Failure Mode | 24 hour dwell | Failure Mode | on PET peel 1/2 | Failure Mode |
| 1 | 1.4 | A | 3.5 | A | 1.7 | A | 3.3 | A | 0.2/0.3 | A |
| 2 | 6.2 | A | 8.4 | A | 7.2 | A | 6.3 | A | 0.8/0.8 | A |
| 3 | 4.2 | C | 0.5 | A | 5.1 | C | 0.4 | AFB | 0.3/0.2 | C |
| 4 | 0.7 | A | 0.2 | A | 1.2 | A | 0.7 | A | 0.3/0.3 | A |
| 5 | 17.0 | AFB | 7.5 | C | 12.5 | C | 10.2 | AFB | 3.5/1.3 | C |
| 6 | 6.4 | AFB | 2.8 | C | 5.3 | C | 0.9 | AFB | 1.0/0.6 | C |
| 7 | 12.1 | AFB | 8.9 | AFB | 11.7 | C | 11.1 | AFB | 3.1/1.9 | C |
| 8 | 8.5 | A | 9.8 | A | 7.6 | A | 7.7 | A | 0.7/0.6 | A |

| | SIS Dispersion (B), Tackifier (Snowtack 100 G), and Plasticizer (Benzyl 2-napthyl ether) | | | | | | | | | |
|---|---|---|---|---|---|---|---|---|---|---|
| | 180° Peel, Stainless Steel (N/inch) | | | | 180° Peel, HDPE (N/inch) | | | | 180° Peel (N), Weighted down with 1 kg, Blocking 50° C. for 1 week (+24 hr CTR) | |
| | 1 | | 24 | | 1 | | 24 | | | |
| | hour dwell | Failure Mode | hour dwell | Failure Mode | hour dwell | Failure Mode | hour dwell | Failure Mode | on PET peel 1/2 | Failure Mode |
| 1 | 2.0 | A | 2.3 | A | 1.5 | A | 2.7 | A | 0.5/0.6 | A |
| 2 | 9.2 | A | 11.9 | AFB | 7.5 | A | 5.7 | A | 3.0/1.0 | A |
| 3 | 19.1 | A | 4.1 | A | 14.1 | A | 11.6 | A | 3.3/3.1 | AFB |
| 4 | 1.1 | A | 0.7 | A | 1.2 | A | 1.0 | A | 0.8/0.4 | A |
| 5 | 11.3 | AFB | 6.8 | AFB | 8.4 | AFB | 10.9 | A | 9.3/8.3 | C |
| 6 | 20.2 | A | 13.1 | A | 12.9 | A | 1.0 | AFB | 4.0/3.2 | C |
| 7 | 13.1 | AFB | 7.9 | AFB | 9.6 | A | 11.2 | A | 7.5/6.1 | C |
| 8 | 9.9 | A | 9.9 | A | 7.7 | A | 5.6 | A | 4.2/3.4 | A |

| | SIS Dispersion (D), Tackifier (Snowtack 100 G), and Plasticizer (Dicyclohexylphthalate) | | | | | | | | | |
|---|---|---|---|---|---|---|---|---|---|---|
| | 180° Peel, Stainless Steel (N/inch) | | | | 180° Peel, HDPE (N/inch) | | | | 180° Peel (N), Weighted down with 1 kg, Blocking 50° C. for 1 week (+24 hr CTR) | |
| | 1 | | 24 | | 1 | | 24 | | | |
| | hour dwell | Failure Mode | hour dwell | Failure Mode | hour dwell | Failure Mode | hour dwell | Failure Mode | on PET peel | Failure Mode |
| 1 | 2.7 | A | 4.1 | A | 2.3 | A | 4.1 | A | 3.8 | A |
| 2 | 2.6 | A | 3.2 | A | 2.4 | A | 3.3 | A | 4.9 | A |
| 3 | 8.2 | A | 11.2 | A | 7.6 | A | 9.2 | A | 7.7 | A |
| 4 | 1.8 | A | 3.0 | A | 2.1 | A | 3.0 | A | 3.5 | A |
| 5 | 6.6 | A | 8.6 | A | 7.5 | A | 6.7 | A | 5.1 | A |
| 6 | 8.1 | A | 13.0 | A | 8.5 | A | 8.7 | A | 7.1 | A |
| 7 | 7.3 | A | 9.2 | A | 7.8 | A | 8.3 | A | 6.0 | A |
| 8 | 3.3 | A | 5.5 | A | 4.6 | A | 5.9 | A | 5.7 | A |

| | SIS Dispersion (D), Tackifier (Snowtack 100 G), and Plasticizer (Sucrose Benzoate) | | | | | | | | | |
|---|---|---|---|---|---|---|---|---|---|---|
| | 180° Peel, Stainless Steel (N/inch) | | | | 180° Peel, HDPE (N/inch) | | | | 180° Peel (N), Weighted down with 1 kg, Blocking 50° C. for 1 week (+24 hr CTR) | |
| | 1 | | 24 | | 1 | | 24 | | | |
| | hour dwell | Failure Mode | hour dwell | Failure Mode | hour dwell | Failure Mode | hour dwell | Failure Mode | on PET peel | Failure Mode |
| 1 | 0.6 | A | 1.3 | A | 0.4 | A | 0.9 | A | 0.0 | A |
| 2 | 1.2 | A | 0.9 | A | 0.9 | A | 0.8 | A | 1.0 | A |
| 3 | 2.7 | A | 8.5 | A | 2.6 | A | 6.9 | A | 0.1 | A |
| 4 | 1.6 | A | 3.3 | A | 1.6 | A | 2.6 | A | 0.3 | A |
| 5 | 9.8 | A | 9.8 | A | 4.2 | A | 5.5 | A | 1.1 | A |
| 6 | 4.2 | A | 10.4 | A | 2.3 | A | 6.2 | A | 0.6 | A |
| 7 | 9.0 | A | 10.0 | A | 4.4 | A | 5.0 | A | 0.7 | A |
| 8 | 1.8 | A | 1.3 | A | 1.1 | A | 1.5 | A | 0.7 | A |

SIS Dispersion (D), Tackifier (Snowtack 100 G), and Plasticizer (Glyceryl Tribenzoate)

| | 180° Peel, Stainless Steel (N/inch) | | | | 180° Peel, HDPE (N/inch) | | | | 180° Peel (N), Weighted down with 1 kg, Blocking 50° C. for 1 week (+24 hr CTR) | |
|---|---|---|---|---|---|---|---|---|---|---|
| | 1 hour dwell | Failure Mode | 24 hour dwell | Failure Mode | 1 hour dwell | Failure Mode | 24 hour dwell | Failure Mode | on PET peel | Failure Mode |
| 1 | 4.0 | A | 4.6 | A | 2.3 | A | 3.5 | A | 4.9 | A |
| 2 | 3.4 | A | 4.1 | A | 1.8 | A | 2.8 | A | 7.3 | A |
| 3 | 5.1 | A | 2.9 | A | 1.5 | A | 1.8 | A | 0.0 | A |
| 4 | 2.7 | A | 4.0 | A | 2.1 | A | 3.2 | A | 4.0 | A |
| 5 | 7.1 | A | 7.3 | A | 6.6 | A | 7.2 | A | 4.3 | A |
| 6 | 6.8 | A | 9.6 | C | 7.4 | A | 4.3 | A | 0.9 | A |
| 7 | 5.5 | A | 7.8 | A | 5.0 | A | 6.1 | A | 6.3 | A |
| 8 | 2.7 | A | 4.2 | A | 2.4 | A | 3.9 | A | 5.7 | A |

SIS Dispersion (D), Tackifier (Snowtack 100 G), and Plasticizer (Benzyl 2-naphthyl ether)

| | 180° Peel, Stainless Steel (N/inch) | | | | 180° Peel, HDPE (N/inch) | | | | 180° Peel (N), Weighted down with 1 kg, Blocking 50° C. for 1 week (+24 hr CTR) | |
|---|---|---|---|---|---|---|---|---|---|---|
| | 1 hour dwell | Failure Mode | 24 hour dwell | Failure Mode | 1 hour dwell | Failure Mode | 24 hour dwell | Failure Mode | on PET peel 1/2 | Failure Mode |
| 1 | 2.2 | A | 1.9 | A | 2.1 | A | 1.4 | A | 2.5/1.0 | A |
| 2 | 3.1 | A | 4.2 | A | 2.9 | A | 3.8 | A | 4.0/3.6 | A |
| 3 | 8.9 | A | 4.9 | A | 7.4 | A | 5.6 | A | 7.4/4.0 | A |
| 4 | 2.1 | A | 3.6 | A | 1.9 | A | 2.7 | A | 2.4/1.9 | A |
| 5 | 4.4 | A | 6.2 | A | 4.8 | A | 6.2 | A | 8.5/8.8 | A |
| 6 | 10.6 | A | 9.4 | A | 8.2 | A | 7.6 | A | 5.7/3.8 | A |
| 7 | 5.8 | A | 6.7 | A | 4.8 | A | 5.9 | A | 8.7/9.0 | A |
| 8 | 3.9 | A | 4.6 | A | 2.8 | A | 3.8 | A | 4.5/4.4 | A |

Direct Thermal Paper

| | 180° Peel, Stainless Steel (N/inch) | | | | 180° Peel, HDPE (N/inch) | | | | 180° Peel (N), Weighted down with 1 kg, Blocking 50° C. for 1 week (+24 hr CTR) | |
|---|---|---|---|---|---|---|---|---|---|---|
| | 1 hour dwell | Failure Mode | 24 hour dwell | Failure Mode | 1 hour dwell | Failure Mode | 24 hour dwell | Failure Mode | on DT Paper peel 1/2 | Failure Mode |
| 1 | 3.1 | A | 5.3 | PT | 21.0 | A | 22.6 | A | 3.7/3.7 | ILT |
| 2 | 0.1 | A | 7.6 | PT | 1.0 | A | 3.1 | A | 3.4/2.1 | ILT |
| 3 | 6.5 | PT | n/a | | 10.4 | PT | n/a | | 3.2/1.6 | ILT |
| 4 | 3.3 | A | 11.9 | A | 24.0 | A | 19.3 | A | 2.6/1.5 | ILT |
| 5 | 6.5 | PT | n/a | | 13.6 | PT | n/a | | 4.2/4.8 | ILT |
| 6 | 1.5 | PT | n/a | | 15.5 | PT | n/a | | 5.2/4.0 | ILT |

Studies of Higher Plasticizer Levels

| | SIS Dispersion | Dispersed Tackifier | Dispersed Plasticizer |
|---|---|---|---|
| 1 | 0.495 | 0.495 | 0.010 |
| 2 | 0.495 | 0.495 | 0.020 |
| 3 | 0.480 | 0.480 | 0.050 |
| 4 | 0.430 | 0.430 | 0.150 |
| 5 | 0.350 | 0.350 | 0.300 |
| 6 | 0.250 | 0.250 | 0.500 |

SIS Dispersion (D), Tackifier (Snowtack 100 G), and Plasticizer (Dicyclohexylphthalate)

| | 180° Peel, Stainless Steel (N/inch) | | | | 180° Peel, HDPE (N/inch) | | | | 180° Peel (N), Weighted down with 1 kg, Blocking 50° C. | |
|---|---|---|---|---|---|---|---|---|---|---|
| | 1 | | 24 | | 1 | | 24 | | for 1 week (+24 hr CTR) | |
| | hour dwell | Failure Mode | hour dwell | Failure Mode | hour dwell | Failure Mode | hour dwell | Failure Mode | on PET peel | Failure Mode |
| 1 | 8.7 | A | 8.4 | A | 3.4 | A | 2.4 | A | 4.3 | A |
| 2 | 6.5 | A | 8.0 | A | 3.4 | A | 4.2 | A | 3.9 | A |
| 3 | 5.7 | A | 9.5 | A | 4.6 | A | 5.3 | A | 5.7 | A |
| 4 | 8.6 | A | 4.8 | A | 6.4 | A | 7.9 | A | 7.3 | A |
| 5 | 8.6 | A | 14.0 | A | 9.0 | A | 9.9 | A | 10.4 | A |
| 6 | 9.2 | C | 15.1 | C | 10.8 | C | 12.8 | C | 1.1 | A |

SIS Dispersion (D), Tackifier (Snowtack 100 G), and Plasticizer (Sucrose Benzoate)

| | 180° Peel, Stainless Steel (N/inch) | | | | 180° Peel, HDPE (N/inch) | | | | 180° Peel (N), Weighted down with 1 kg, Blocking 50° C. | |
|---|---|---|---|---|---|---|---|---|---|---|
| | 1 | | 24 | | 1 | | 24 | | for 1 week (+24 hr CTR) | |
| | hour dwell | Failure Mode | hour dwell | Failure Mode | hour dwell | Failure Mode | hour dwell | Failure Mode | on PET peel | Failure Mode |
| 1 | 5.0 | A | 4.2 | A | 3.5 | A | 6.5 | A | 2.4 | A |
| 2 | 7.1 | A | 9.3 | A | 6.3 | A | 4.8 | A | 2.0 | A |
| 3 | 7.9 | A | 9.1 | A | 5.0 | A | 1.7 | A | 1.8 | A |
| 4 | 1.7 | A | 3.3 | A | 0.8 | A | 0.8 | A | 1.0 | A |
| 5 | 0.0 | A | 0.0 | A | 0.0 | A | 0.0 | A | 0.2 | A |
| 6 | 0.0 | A | 0.0 | A | 0.0 | A | 0.1 | A | 0.0 | A |

Characteristics of Plasticizers

| Material | Tm (° C.) | Tg (° C.) | $\Delta\delta$ (MJ/m³)$^{1/2}$ | $\Delta H_{fus}$ | $T_g$ reduction of Styrene (° C.) |
|---|---|---|---|---|---|
| Benzyl-2-Naphthyl Ether (BON) | 100.9 | — | 6.38 | 136 J/g | 28.0 |
| Glyceryl Tribenzoate (GTB) | 71.9 | — | 3.36 | 70 | 26.1 |
| p-Tolylphenyl Acetate (p-TPA) | 73.3 | — | 5.10 | 147 | 24.7 |
| Benzalphthalide | 98.4 | — | 6.43 | 75 | 26.9 |
| Tetraethylthiuram Disulfide (TETS) | 70.2 | — | 3.78 | 107 | 21.1 |
| Vanillin Acetate | 76.0 | — | 4.14 | 151 | 28.3 |
| Ethyl Vanillin | 76.5 | — | 7.07 | 154 | 67.4 |
| Glucose Pentaacetate | 112.0 | — | 3.09 | 95 | 58.0 |
| Sucrose Benzoate | 70.1 | 63.8 | 15.88 | 11.1 | 28.5 |
| Propyl-4-Hydroxy Benzoate | 96.5 | — | 5.14 | 165 | 68.4 |
| 3,5-di-tert-butyl-4-Hydroxybenzyl Alcohol | 144.0 | — | 3.55 | 122 | 51.5 |
| Methyl-4-Hydroxy Benzoate | 126.1 | — | 6.65 | 187 | 34.4 |
| Butyl-4-Hydroxy Benzoate | 69.1 | — | 4.60 | 141 | 56.1 |
| Benzoic Acid | 122.9 | — | 3.16 | 162 | 46.2 |
| Phenoxyacetic Acid | 98.0 | — | 3.18 | 191 | NM |

The invention claimed is:

1. A composition comprising: (a) from 20 to 80 dry wt % of a styrene-diene block copolymer having from 10-30 wt % polymerized units of styrene, wherein the block copolymer is present as a dispersion of copolymer in water, and said dispersion contains less than 5 wt % organic solvent based on total dispersion weight; (b) from 0.5 to 20 dry wt % of a plasticizer; and (c) from 20 to 80 dry wt % of a tackifier.

2. The composition of claim 1 in which Hoy $\Delta\delta$ solubility parameter for the plasticizer and polystyrene is from 2.5 to 30 (mJ/m³)$^{1/2}$.

3. The composition of claim 2 in which the tackifier comprises a rosin ester resin, a non-hydrogenated aliphatic $C_5$ resin, a hydrogenated aliphatic $C_5$ resin, an aromatic modified $C_5$ resin, a terpene resin, a hydrogenated $C_9$ resin, or combinations thereof.

4. The composition of claim 3 in which the styrene-diene block copolymer has 10-70 wt % diblock content and 30-90 wt % triblock content and the dispersion of copolymer in water comprises a dispersant selected from the group consisting of $C_{18}$-$C_{32}$ aliphatic carboxylic acids and olefin-acrylic acid copolymers.

5. The composition of claim 4 in which the tackifier has a softening point from 65 to 180° C.

6. The composition of claim 5 in which the composition comprises: (a) from 25 to 65 dry wt % of the copolymer; (b) from 4 to 15 dry wt % of the plasticizer; and (c) from 25 to 70 dry wt % of the tackifier.

7. The composition of claim 6 in which the plasticizer is amorphous and has a softening point from 50-150° C.

8. A method for preparing a heat-activated pressure sensitive adhesive; said method comprising combining: (a) from 20 to 80 dry wt % of a styrene-diene block copolymer having from 10-30 wt % polymerized units of styrene, wherein the block copolymer is present as a dispersion in water, and the dispersion contains less than 5 wt % organic solvent based on total dispersion weight; (b) from 0.5 to 20 dry wt % of a plasticizer; and (c) from 20 to 80 dry wt % of a tackifier; to produce an adhesive composition; and coating the adhesive composition on paper or plastic film, said paper or plastic film having a thickness from 12 to 130 microns.

9. The method of claim 8 in which Hoy $\Delta\delta$ solubility parameter for the plasticizer and polystyrene is from 2.5 to 30 $(MJ/m^3)^{1/2}$.

10. The method of claim 9 in which the adhesive composition is prepared by combining: (a) from 25 to 65 dry wt % of the copolymer; (b) from 4 to 15 dry wt % of the plasticizer; and (c) from 25 to 70 dry wt % of the tackifier.

* * * * *